(12) United States Patent
Ostermeyer

(10) Patent No.: US 6,626,498 B1
(45) Date of Patent: Sep. 30, 2003

(54) SIDE-DISCHARGE TIPPER VEHICLE WITH SIDE WALL FLEXIBLY CONNECTED TO THE MAIN BODY

(76) Inventor: Bernd Ostermeyer, Lot 1802, Hardy Road, Berrimah, Darwin, Northern Territory 0828 (AU)

( * ) Notice: Subject to any disclaimer, the term of this patent is extended or adjusted under 35 U.S.C. 154(b) by 0 days.

(21) Appl. No.: 09/979,446

(22) PCT Filed: May 24, 2000

(86) PCT No.: PCT/AU00/00495

§ 371 (c)(1),
(2), (4) Date: Feb. 21, 2002

(87) PCT Pub. No.: WO00/71385

PCT Pub. Date: Nov. 30, 2000

(30) Foreign Application Priority Data

May 25, 1999 (AU) ............................................. PQ0567
Nov. 1, 1999 (AU) ............................................. PQ3790
Apr. 10, 2000 (AU) ............................................. PQ6819

(51) Int. Cl.⁷ .................................................. B60P 1/34
(52) U.S. Cl. ........................................ 298/18; 298/1 A
(58) Field of Search ........................ 298/1 A, 13, 17.7, 298/18, 22 R, 22 J, 22 D, 23 MD

(56) References Cited

U.S. PATENT DOCUMENTS

| | | | |
|---|---|---|---|
| 1,611,012 A | * 12/1926 | Flowers | 298/17.7 |
| 3,101,974 A | * 8/1963 | Robertson et al. | 298/17.6 |
| 3,228,727 A | * 1/1966 | Paulson | 298/11 |
| 3,240,164 A | * 3/1966 | Flowers | 105/276 |
| 3,741,128 A | * 6/1973 | Flowers | 105/377.05 |
| 3,856,354 A | * 12/1974 | Davis | 298/10 |
| 4,407,202 A | * 10/1983 | McCormick | 105/271 |
| 4,487,007 A | * 12/1984 | Mullet et al. | 56/16.6 |
| 4,619,484 A | * 10/1986 | Maxey | 298/18 |
| 5,265,940 A | 11/1993 | Ostermeyer | 298/1 B |
| 5,836,657 A | * 11/1998 | Tilley et al. | 298/1 A |
| 5,906,417 A | * 5/1999 | Golden | 298/17.6 |

FOREIGN PATENT DOCUMENTS

| | | | | |
|---|---|---|---|---|
| FR | 1209761 | | 3/1960 | |
| WO | 8902838 | * | 4/1989 | 298/18 |

* cited by examiner

*Primary Examiner*—D. Glenn Dayoan
*Assistant Examiner*—Paul Chenevert
(74) *Attorney, Agent, or Firm*—Kinney & Lange, P.A.

(57) ABSTRACT

A vehicle tipper system including a container body (30), a displaceable side wall (33) located on a discharge side of the container body (30), the side wall (33) being flexibly connected with the rest of the container body (30) at least one actuation assembly (16) for displacing the side wall (33) to an open position, and for tipping container body (30) such that product held within the container body (30) can be tipped from the discharge side thereof when the side wall (33) is in the open position.

21 Claims, 13 Drawing Sheets

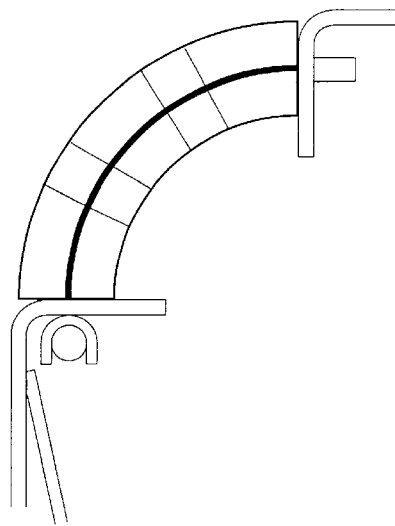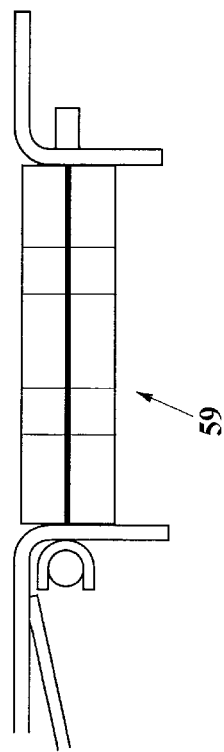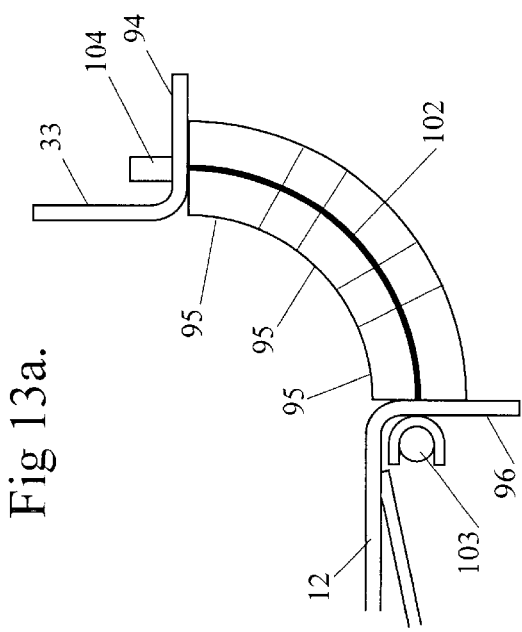

SIDE-DISCHARGE TIPPER VEHICLE WITH SIDE WALL FLEXIBLY CONNECTED TO THE MAIN BODY

The present invention is generally directed to tipper systems for vehicles, and in particular to door type side tipper systems. Such systems can be used on different types of vehicles including road and rail trucks, trailers and semi-trailers for bulk or mass material haulage and transport.

Conventional door type side tipper systems utilise an elongate container body having a generally rectangular cross-section. A hinged door is provided . along one elongate side of the container body, the hinge extending continuously along the length of the door. This door is provided on a discharge side of the body. A series of body hinges are also provided between the container body and the vehicle chassis supporting the body to allow the container body to be tipped towards its discharge side. The hinged door is opened prior to or during this tipping motion to allow the product held within the container body to be tipped therefrom. Because of the loads applied to the container body during tipping motions and vehicle travel, elongate body runners and lateral cross members are required to be secured to the container body for support and reinforcement reasons.

Such conventional door type side tipper systems therefore have a number of disadvantages as follows:

- a substantial amount of work is required to manufacture and incorporate the door and body hinges
- a the inclusion of the door and body hinges adds a significant weight to a side tipper system
- the door hinge arrangement cannot be readily sealed leading to the escape of liquids which can be environmentally harmful; a loss of valuable material held within the container body can also occur
- corrosive materials can enter and seize up the door and/or body hinges
- material can be caught in and can break the door and/or body hinges
- there are high maintenance costs due to the large number of moving parts
- the required body runners and cross members significantly add to the overall weight and cost of the system
- the doors can often get bogged in a dumped heap of tipped product because of the low height of the door when the system is fully tipped.

It is therefore an object of the present invention to provide a vehicle side tipper system that avoids at least one of the above-noted problems.

With this in mind, according to one aspect of the present invention, there is provided a vehicle tipper system comprising:

- a container body having a displaceable side wall located on a discharge side of the container body, the side wall being flexibly connected with and displaceable relatively to the rest of the container body;
- at least one actuation assembly for displacing the side wall to an open position away from the rest of the container body; and for tipping the container body such that product held within the container body can be tipped from the discharge side thereof when the side wall is in the open position.

The displaceable side wall may therefore provide the door for the tipper system according to the present invention.

The side wall may form a part of a body skin. In the transport position of the tipper system prior to any tipping thereof, the body skin is supported to form a relatively rigid elongate channel which provides a floor and a fixed side wall of the container body, as well as the displaceable side wall. The body skin may be formed from any one of a variety of different materials including aluminium, steel, plastics, rubber and stainless steel depending on the operation and product to be transported. It is however also envisaged that the body skin be formed of a composite of materials. For example, the displaceable side wall portion of the body skin may be made of a flexible material, with the rest of the body skin being made of a relatively rigid material.

In a possible arrangement of the present invention, the body skin may be formed of a sheet of steel, the stiffness of the steel being sufficiently low to allow a portion of the steel sheet to provide the displaceable side wall, This is particularly applicable for relatively small container bodies. In the case of larger container bodies, the steel will need to be of a greater thickness to provide structural strength, this thickness being such that the stiffness becomes too high to allow for ready flexing of the sheet. It is therefore alternatively possible for a flexible hinge to be provided between the sheet forming the side wall and the sheet providing the body skin.

The flexible hinge may extend at least substantially the entire length of the side wall. The flexible hinge may be in the form of one or more flexible sheets interconnecting the side wall and the rest of the body skin. The flexible sheet may be formed from rubber or any other flexible material. Alternatively, the flexible hinge may include at least one elongate flexible billet extending along at least substantially the entire length of the side wall, the flexible billet being fastened or clamped between sections of the body skin, the side wall and/or intermediate sections where more than one flexible billet is provided. The flexible billet may be bolted or clamped between said body skin, side wall and/or intermediate sections such that it is held in compression. The flexible billet may also be formed from rubber or other flexible material.

The body skin may be supported between two end assemblies of the container body. Each end assembly may include an end panel providing an end wall for the container body. A flange may be provided on the end panel, and a portion of the periphery of the body skin may be secured to the flange. The portion of the body skin providing the displaceable side wall may however remain detached from the flange to thereby allow movement thereof. The body skin may be secured by means of fastening means such as, for example, bolts or rivets. A resilient means such as a rubber sheet may be provided between the body skin and the flange. This allows for a degree of twist movement of the container body. This can occur when there is a variation in loading along the container body as it is tipped due to the distribution of product contained therein. A resilient means may also extend between the displaceable side wall and the end assembly to provide a tight seal there between. Alternatively, the body skin may be secured thereto by welding or by adhesive. It is also envisaged that the body skin may be secured directly to the end panel.

The actuation assembly may include a means for displacing the displaceable side wall. The displacing means may include a respective door ram assembly mounted between each end assembly and the displaceable side wall. The ram assembly may be pivotally mounted on the end assembly and may have an actuation arm extending therefrom and pivotally connected to the displaceable side wall. Extension of the actuation arm results in movement of the side wall to the open position. Retraction of the actuating arm returns the side wall to its initial position. The ram assembly may be either hydraulic or pneumatic ram in operation.

The container body may be supported on a chassis cradle frame, and may be pivotally mounted to the chassis cradle frame. In particular, each end assembly of the container body may be pivotally mounted to a body pivot provided on or adjacent the chassis cradle frame. The body pivot points may be located adjacent the discharge side of the container body. The chassis cradle frame also helps to support the body skin of the container body when holding product therein.

The actuation assembly may further include means for tipping the container body. The tipping means may include a respective body ram assembly mounted between each end assembly and the chassis cradle frame. The ram assembly may be pivotally mounted on or adjacent the chassis cradle frame and may have an actuation arm extending therefrom and pivotally connected to the end assembly. Extension of the actuation arm results in the movement of the container body to the tipping position due to rotation of the container body about the body pivot mounts. The ram assembly may be either hydraulic or pneumatic ram in operation.

The actuation assembly may, in an alternative preferred embodiment of the vehicle tipper system of the present invention include a single ram assembly, and a mechanical linkage arrangement for both displacing the side wall and for tipping the container body. The ram assembly may be pivotally mounted on or adjacent the chassis cradle frame and may have an actuation arm extending therefrom. The actuation arm may be pivotally connected to a primary linkage arm mounted at one end thereof at or adjacent a top corner of the end assembly away from the side wall.

A secondary linkage arm may also be provided. One end of the secondary linkage arm may be pivotally connected to the side wall. A cross linkage may interconnect the opposing end of the primary and secondary linkage arms. The secondary linkage arm may include a lateral extension which may be pivotally mounted adjacent a side support means provided on the chassis frame. This support means may include a support pipe extending longitudinally along the side of the chassis frame adjacent the side wall. When the side wall is closed, or during opening of the side wall, the side wall may be supported by the secondary linkage arm which itself may be supported on the support pipe. This support is important where a flexible hinge is provided for the side wall. The linkage arrangement may provide an "over-centre" assembly such that the initial pivotal displacement of the primary linkage arm, which is displaced by means of the ram assembly, results in the opening of the side wall. Further pivotal displacement of the primary linkage arm results in the tipping of the container body while the side wall remains open.

According to yet another preferred embodiment of the vehicle tipper system according to the present invention, the container body may include a further upper door located over the displaceable side wall and pivotally mounted on the container body. The actuation assembly may include means to open both the upper door and side wall forming a "lower door" thereof. Both the upper and lower doors may open simultaneously. To this end, a rigid link may connect the upper door to a linkage arm of the actuation assembly, the linkage arm being pivotally mounted to the end wall and urged for movement by a ram assembly.

The actuation assembly may include a further actuation means for displacing the side wall. This further actuation means allows for a displacement of the side wall when it is not required or desired to tip the container body. The actuation means may include a further ram assembly connecting the side wall with the rest of the actuation assembly.

According to another aspect of the present invention, there is provided a tipping vehicle including a vehicle tipper system according to the present invention.

The vehicle tipper system according to the present invention provides a door type side tipper system which does not require any door hinges or body hinges of the type used on conventional door type side tipper systems. Furthermore, the construction of the tipper system according to the present invention significantly reduces the weight of the tipper system. The disadvantages of conventional door type side tipper systems can therefore be generally avoided by the vehicle tipper system according to the present invention.

It will be convenient to further describe the present invention with respect to the accompanying drawings which illustrate preferred embodiments of the vehicle tipper system according to the present invention. Other embodiments of the invention are possible and consequently, the particularity of the accompanying drawings is not to be understood as superseding the generality of the preceding description of the invention.

Figure 12C:
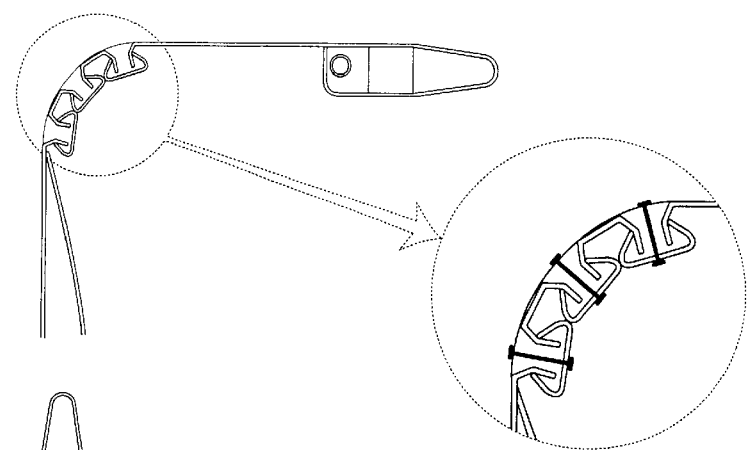
Figure 12B:
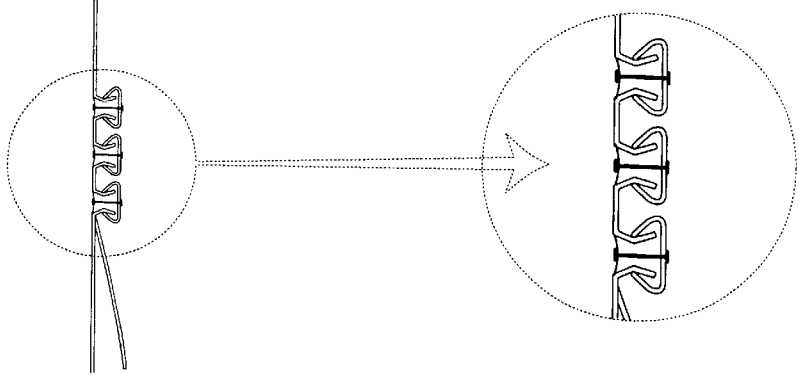
Figure 12A:
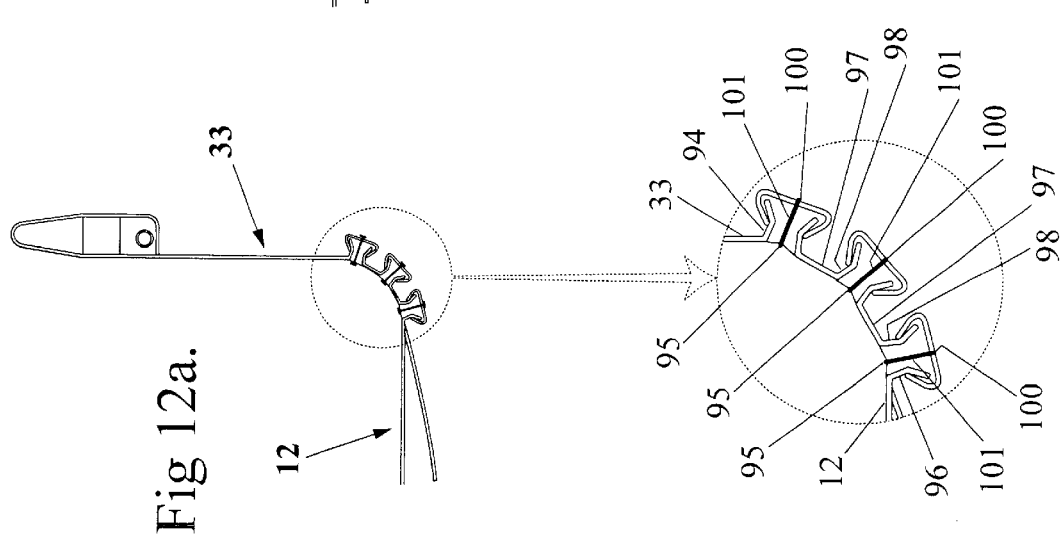

FIGS. 12a to 12c are schematic cross-sectional side views respectively showing three stages of opening of a further arrangement of the flexible hinge of the vehicle tipper system according to the present invention; and FIGS. 13a to 13c are schematic cross-sectional side views respectively showing three stages of opening of yet another arrangement of the flexible hinge of the vehicle tipper system according to the present invention.

Figure 1:
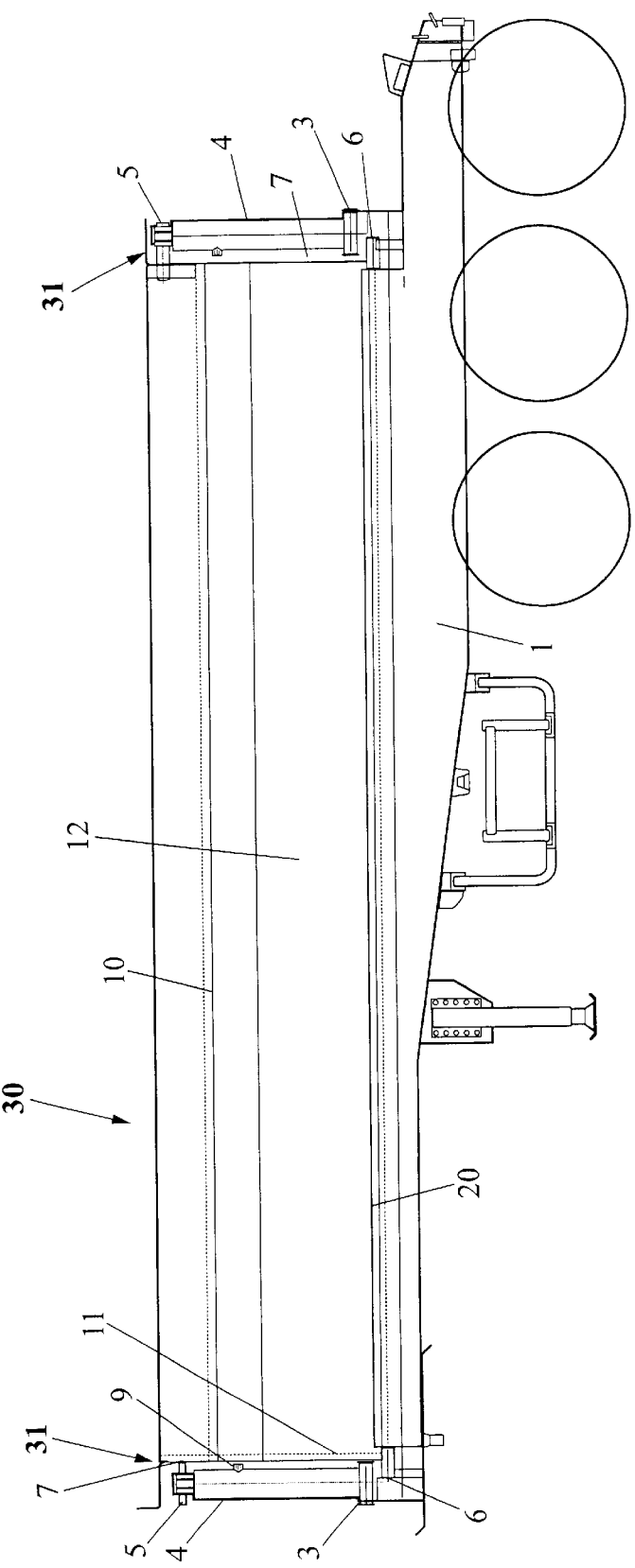
FIG. 1 is a side view of a first preferred embodiment of a vehicle tipper system according to the present invention.
Figure 2:
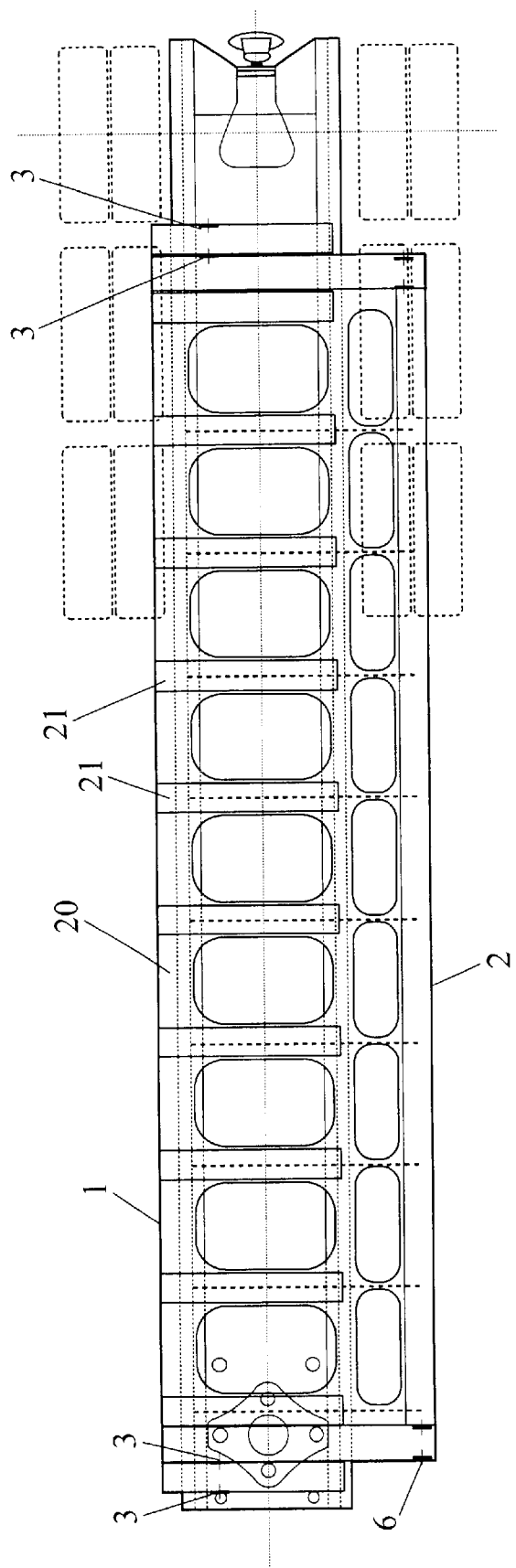
FIG. 2 is a plan view of the vehicle tipper system of FIG. 1.

Referring initially to FIGS. 1 and 2, there is respectively shown a side and plan view of a first preferred embodiment of a vehicle tipper system according to the present invention mounted on a vehicle chassis 1. The vehicle chassis 1 can be adapted for use in rail or road vehicle applications. The vehicle, chassis 1 includes a cradle chassis frame 38 and a suspension chassis frame 39 (shown in FIG. 6). The cradle chassis frame 38 has a top plate 20 which can be shaped to accept the bottom of a container body 30 of the vehicle tipper system.

The container body 30 is formed of a body skin 12 supported between two end assemblies 31. The body skin 12 is supported to form an elongate channel for supporting product therein. The body skin 12 is made of a flexible material such as, for example, aluminium, steel, plastics, rubber and stainless steel depending on the operation and product to be transported. An end assembly 31 is provided at each end of the elongate channel provided by the body skin 12 to complete the containment volume for the container body 30.

A series of cushion strips 21 can be attached to the top plate 20 to damped any bounce of the container body 30 as well as to support the body skin 12 of the container body 30 when loaded. The cushion strips 21 may typically be formed of plastic and rubber. A chassis rail pipe 2 extends parallel to and along a discharge side of the tipper system. This rail pipe 2 is mounted to the cradle chassis frame 38 and is used to support the container body 30 when undergoing a tipping motion.

Figure 3:
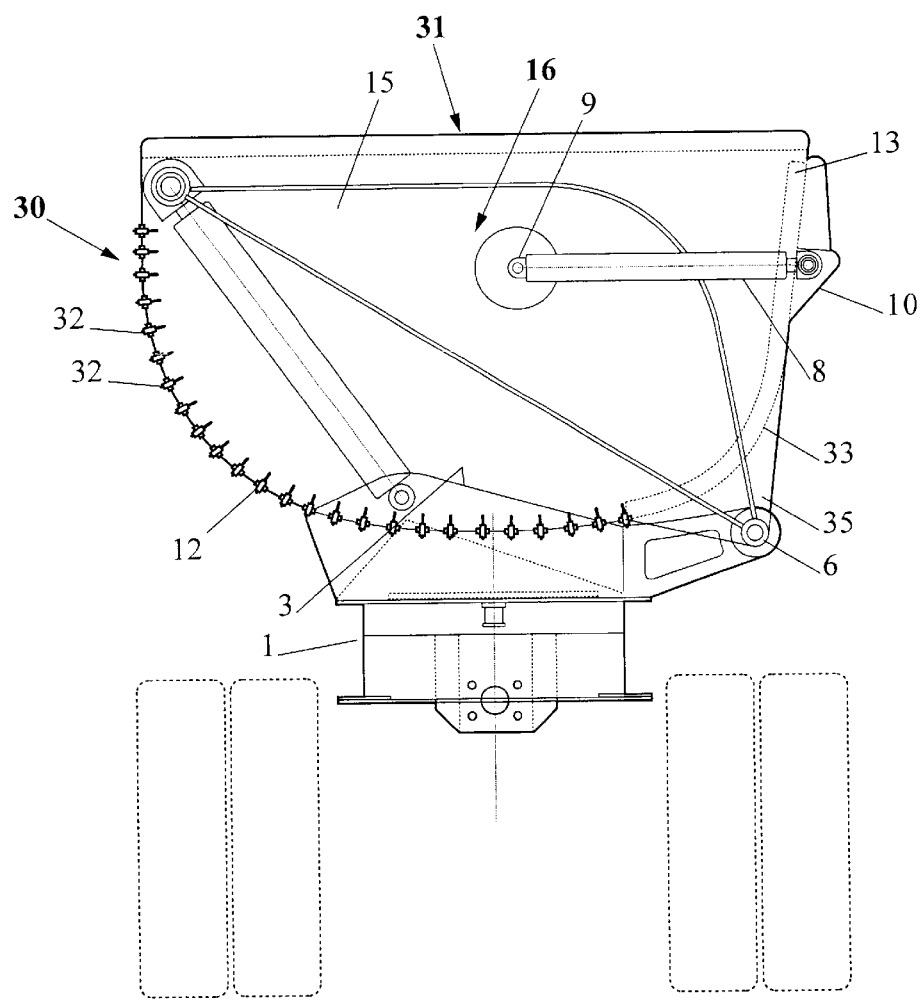
FIG. 3 is an end view of the vehicle tipper system of FIG. 1 showing the tipper system in a transport position.

Referring now to FIG. 3, there is shown an end view of the vehicle tipper system when in a transport position, ie, when the tipper system is not undergoing a tipping motion showing in more detail the end assembly 31. The end assembly 31 includes an end panel 7 which closes off the end of the elongate channel formed by the body skin 12. A flange 11 (best shown in FIG. 1) is provided on the face of the end panel 7 facing the interior volume of the container body 30. The portion of the body skin 12 providing the base and stationary side wall of the container body 30 is secured to the flange 11 by a series of fastening means 32. The rest of the body skin 12 is not secured to the flange 11 and therefore provides a displaceable side wall 33. This displaceable side wall 33 provides the "door" for the tipper system according to the present invention as will be subsequently described.

The end assembly 31 is pivotally mounted about a body pivot point 6 located on the chassis pipe rail 2. The body pivot point 6 is provided on the discharge side of the container body 30. FIG. 3 shows the end panel 7 having an extension 35 which is pivotally mounted to the body pivot point 6.

Figure 4:
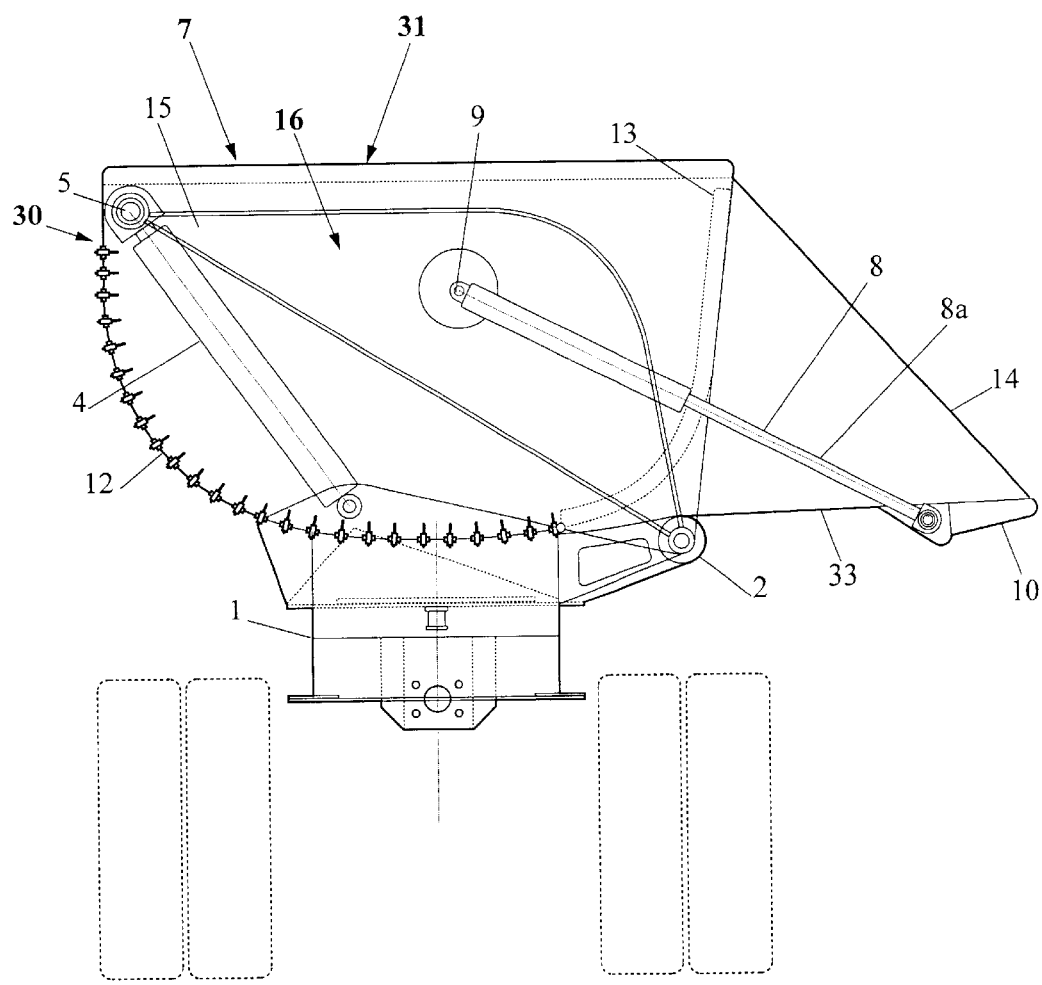
FIG. 4 is an end view of the vehicle tipper system of FIG. 1 showing the tipper system with the displaceable side wall in an open position.

In FIG. 4, the displaceable side wall 33 is shown in its fully open position prior to the tipping motion of the tipper system. The actuation assembly 16 for opening the side wall 33 and tipping the container body 30 includes a door hydraulic ram 8. A reinforcement plate 15 is secured to the end panel 7, and a pin 9 extends therefrom. The door hydraulic ram 8 is pivotally supported on the pin 9 of the end assembly 31. The actuation rod 8a of the door hydraulic ram 8 is secured to a coaming railing 10 secured to the displaceable side wall 33. Extension of the door hydraulic ram 8 results in movement of the displaceable side wall 33 to its open position. A cushion seal 13 is provided between the flange 11 and the displaceable side wall 33. When the side wall 33 is in a closed position as shown in FIG. 3, the cushion seal 13 provides a tight seal there between. The side wall 33 is held in this closed position as shown in FIG. 3, the cushion seal 13 provides a tight seal there between. The side wall 33 is held in this closed position when the door hydraulic ram 8 is [full] fully retracted. It is also possible for a resilient means such as a rubber sheet to be provided between the body skin 12 and the flange 11 of the end assembly 31. This allows the container body 30 to twist to a small degree during the tipping motion due to the uneven distribution of product along the length of the container body 30.

Figure 5:
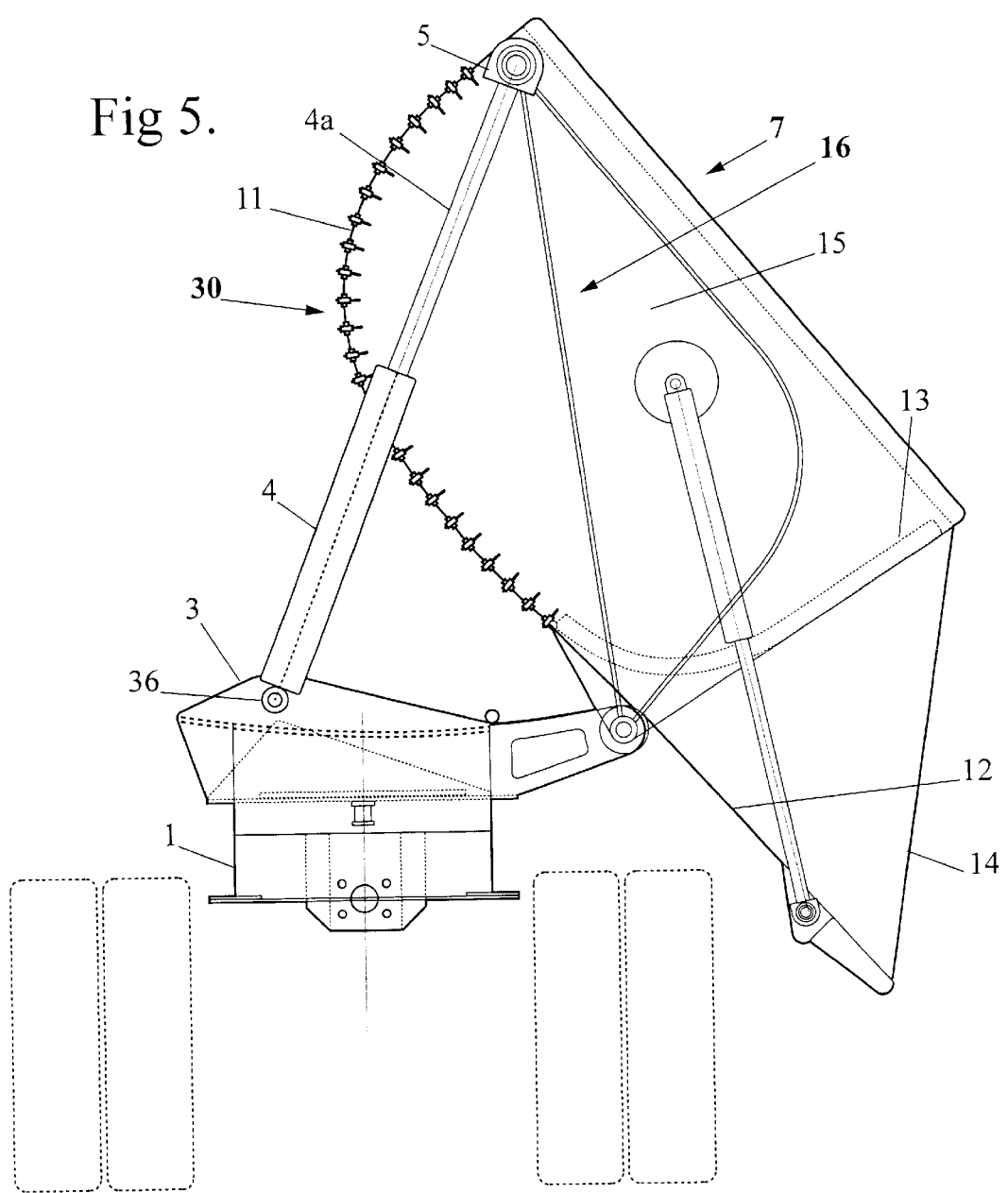
FIG. 5 is an end view of the vehicle tipper system of FIG. 1 showing the tipper system in a tipping position.

FIG. 5 shows the container body 30 in its tipping position. The container body 30 is displaced to this position by means of a body hydraulic ram 4. This body hydraulic ram 4 is supported on a lower mounting pin 36 extending between a pair of closely adjacent mounting plates 3 at each respective end of the chassis cradle frame 1. The actuation rod 4a of the body hydraulic ram 4 is pivotally secured by a spherical bearing to a lift coaming rail pin 5 provided at the "lift side" of the container body 30. Therefore, extension of the actuation rod 4a results in the tipping motion of the container body 30. It should also be noted that a rubber panel 14 is located between the end of the displaceable side wall 33 and the end assembly 31 to prevent spillage and to provide protection for the door hydraulic ram 8. It is also envisaged that this panel 14 can be made of a relatively rigid material.

In a tipping operation, the door hydraulic rams 8 are initially extended outwards pushing the displaceable side wall 33 to its open position as shown in FIG. 4. Once in this position, the body hydraulic ram 4 is extended to lift the container body 30 and pivot it around the body pivot point 6. While the container body 30 is being lifted, the displaceable side wall 33 rolls around the chassis rail pipe 2 until the desired tipping angle of the tipper system is reached. Product can then be tipped from the interior volume of the container body 30.

When returning the container body 30 to its usual transport position, the body hydraulic ram 4 is initially retracted to return the container body 30 onto the chassis cradle frame 1. Once the container body 30 is supported on the chassis cradle frame 1, the displaceable side wall 33 can be retracted and can seal against the cushion seal 13 as shown in FIG. 3.

Figure 6:
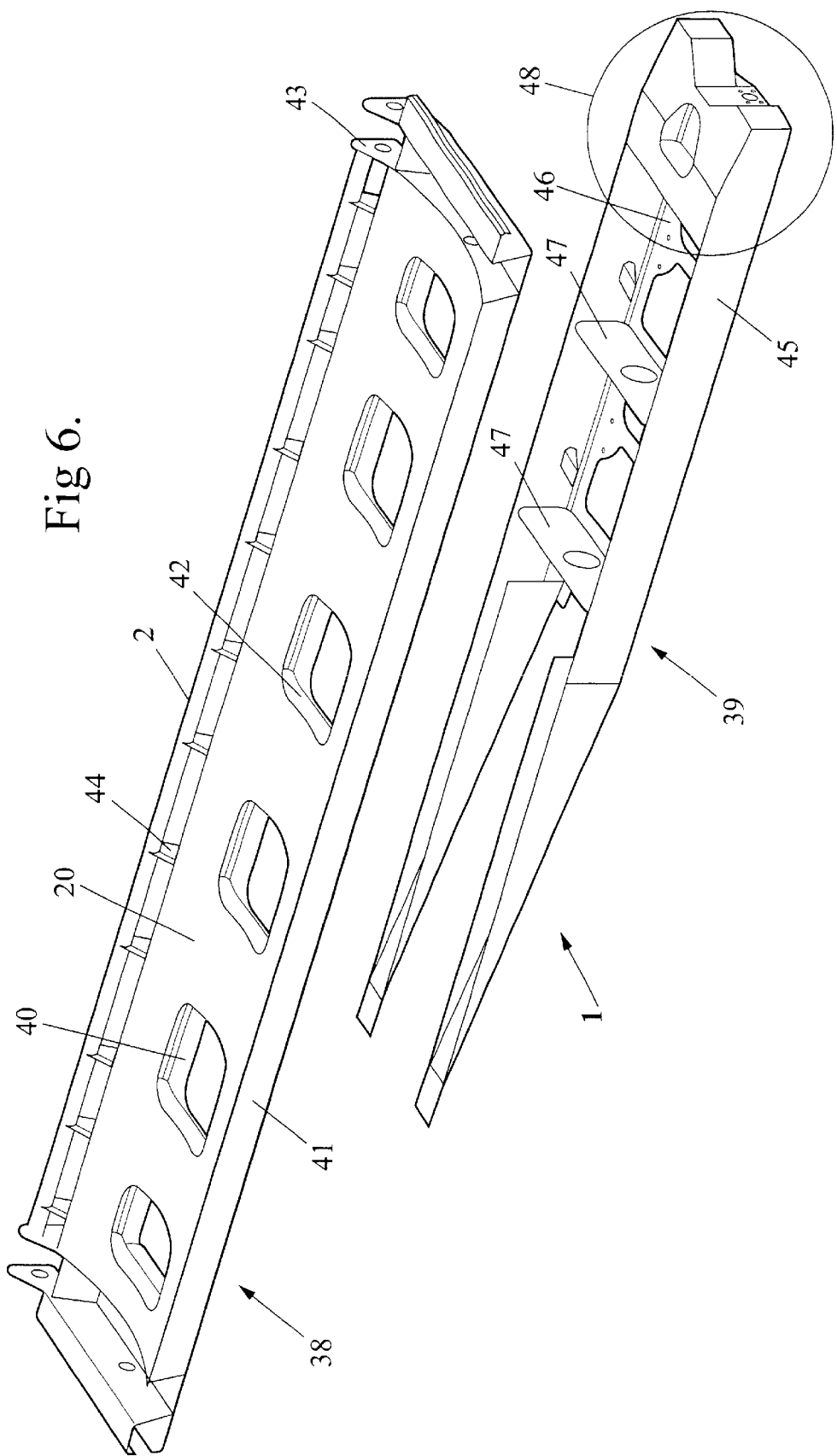
FIG. 6 is an exploded perspective view of the chassis cradle frame according to the present invention.

FIG. 6 shows in more detail the vehicle chassis 1. The vehicle chassis 1 has also been designed to reduce manufacturing time and cost by producing it as a two part chassis 1 where the cradle chassis frame 38 is separate to the suspension chassis frame 39. Therefore allowing the top and bottom chassis frame to be manufactured simultaneously.

The vehicle chassis 1 has been designed as a 'sandwich' type construction. The cradle chassis frame 38 includes base and webs 40,41 fabricated from one piece of plate which has been profile cut into shape, the sides being bent upward to produce the web 41. Following that procedure profile cut X-members 42 are located within the base. Their primary function is to provide strength in the cradle chassis frame 38. The top flange of the X-members are shaped to support the top plate 20, which has been rolled to a radius that complements the body 30. Hoist X-members 43 are at both ends of this construction.

The pipe 2 over which the side wall 33 opens over is fixed at either end onto the hoist X-members 43, then welded back to the chassis with gusset plates 44 which have been located in direct alignment with the X-members in the cradle chassis frame 38 previously mentioned.

The suspension chassis frame 39 is similar in design construction to the cradle chassis frame 38. The base 46 and webs 45 are fabricated from one piece of plate which has been profile cut into shape, and the sides are bent upward to produce the webs 45. The structure is then reinforced with profile cut X-members 47. The rear section of the chassis houses the RINGFEDER™ coupling 48 and has been designed as a reinforced unit that ties in with the main structure.

Figure 7A:
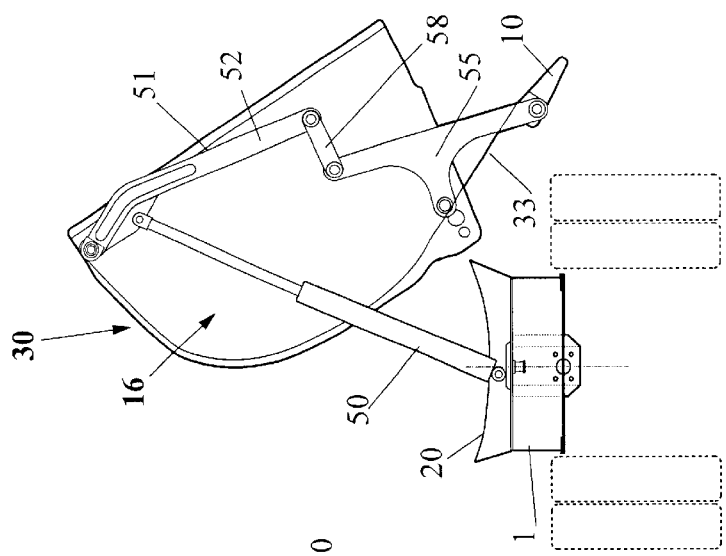
FIGS. 7a to 7c are respective end views of a second preferred embodiment of a vehicle tipper system according to the present invention.
Figure 7B:
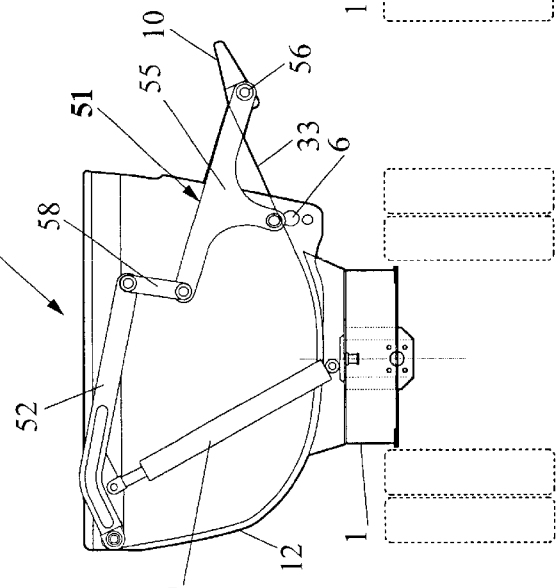
Figure 7C:
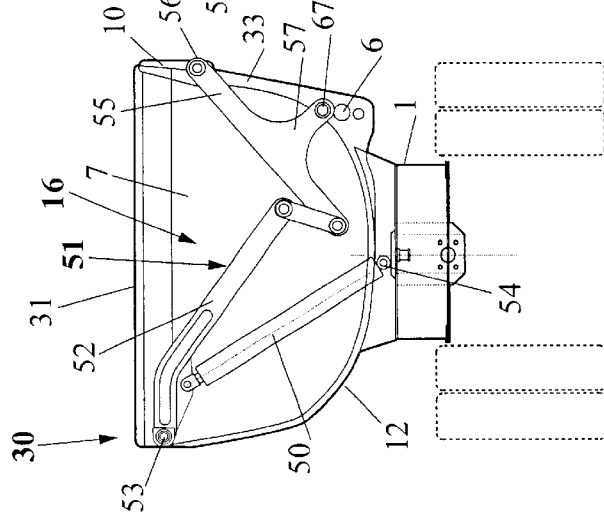

FIGS. 7a to 7c show a second preferred embodiment of a vehicle tipper system according to the present invention. The same reference numerals are used to designate integers corresponding to those in the embodiment shown in FIGS. 1 to 5 for clarity reasons.

The end assembly 31 shown in FIGS. 7a to c includes a single ram assembly 50 and a mechanical linkage arrangement 51 for both opening the side wall 33 and the tipping of the container body 30. The linkage arrangement 51 includes a primary linkage arm 52 which is pivotally mounted at a pivot point 53 located at a top corner of the end assembly 31 away from the side wall 33. The ram assembly 50 is pivotally mounted above a chassis pivot 54 located on the vehicle chassis 1 at one end thereof. The other end of the ram assembly 50 is pivotally mounted to the primary linkage arm 52.

The linkage arrangement also includes a secondary linkage arm 55 pivotally secured at a door pivot point 56 to the side wall 33. The secondary linkage arm 55 includes a lateral extension 57 which normally rests on and is pivotally supported on a lower pivot point 67 located adjacent the body pivot point 6 of the vehicle chassis 1.

The linkage arrangement 51 further includes a cross linkage 58 interconnecting the primary and secondary linkage arms 52,55. This cross linkage 58 provides an "over-the-centre" arrangement of the linkage arms 52,55.

In the normal carrying position of the container body 30 shown in FIG. 7a, the ram assembly 50 is fully retracted, and the linkage arrangement 51 acts to hold the side wall 33 closed.

The initial extension of the ram assembly 50 results in the opening of the side wall 33 as shown in FIG. 7b. Further extension of the ram assembly 50 results in the tipping of the container body 30. This construction ensures that tipping cannot occur before the side wall 33 is opened.

Figure 8:
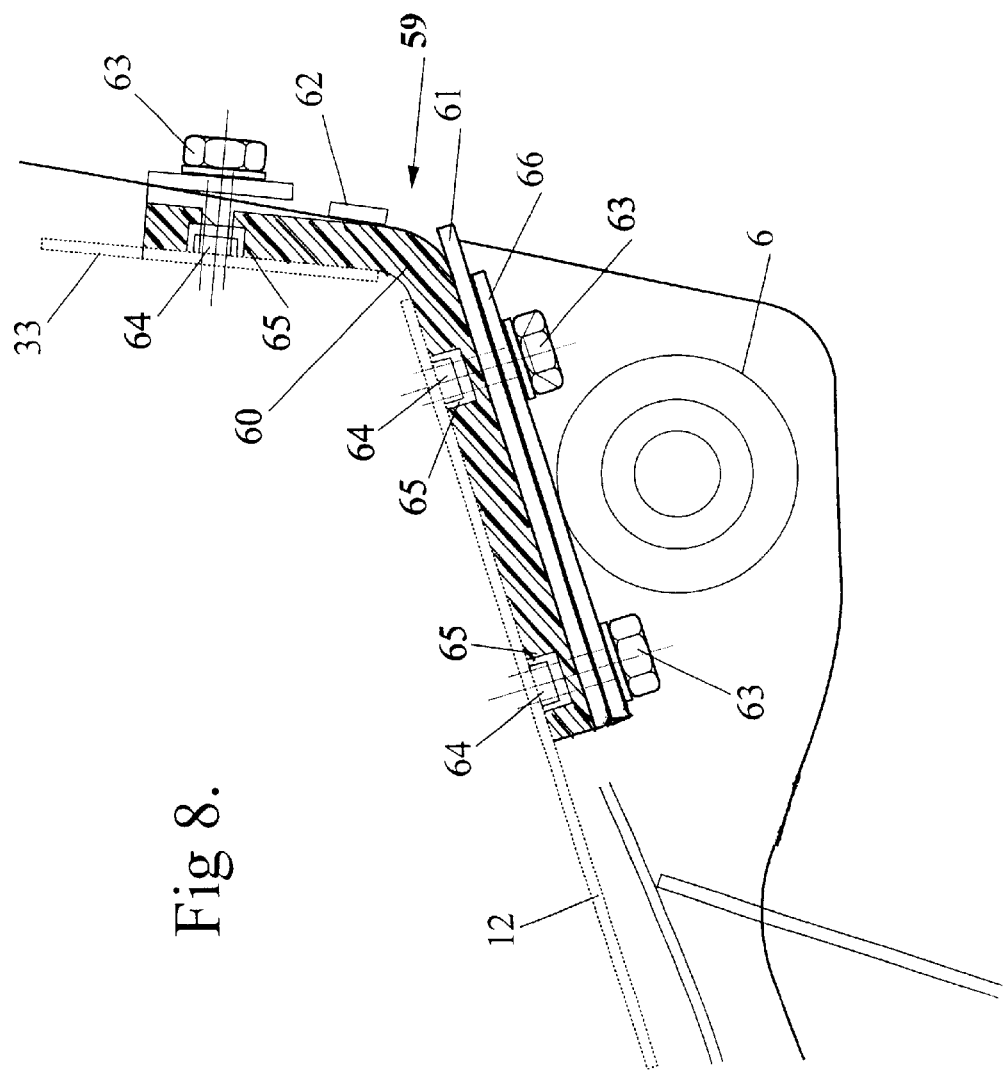
FIG. 8 is a detailed view of a flexible hinge of the vehicle tipper system of FIGS. 7a to 7c.

In smaller tipper systems, the body skin 12 could be provided by a single sheet of steel. The side wall 33 can be displaced because of the yield of the steel sheet. In larger tipper systems, the steel sheet needs to be of thicker gauge to provide adequate structural strength. The stiffness of the steel sheet becomes too high to allow for flexing of the sheet. It is therefore necessary to provide a flexible hinge 59 as shown in FIG. 8. The flexible hinge 59 is typically formed by a sheet of rubber 60 or other flexible material. This rubber sheet 60 is sandwiched between the body skin 12 and a backing plate 61 at one section thereof, and between the side wall 33 and wall backing plate 62 at the other section thereof.

Fastening bolts 63 hold together the body skin 12 and backing plate 61 and the side wall 33 and wall backing plate 62. The bolts 63 engaged threaded lugs 64 secured to the body skin 12 and side wall 33. Cavities 65 are provided in the flexible sheet 60 to accommodate the lugs 64 in a flush manner. A further wear plate 66 is also provided over the backing plate 61.

The side wall 33 needs to be supported when the flexible hinge 59 is provided. The linkage arrangement 51 therefore acts to support the side wall 33 at all positions. The secondary linkage arm 55 is pivotally supported on the lower pivot pint 67 and therefore supports the side wall 33 at all positions thereof. The flexible hinge 59 also rests on the support pipe 6, which acts to also support the side wall 33. The wear plate 66 protects the support pipe 6 and backing plate 61 from wear.

The use of a flexible hinge 59 allows the vehicle tipper system to be used on larger capacity vehicles.

Figure 9:
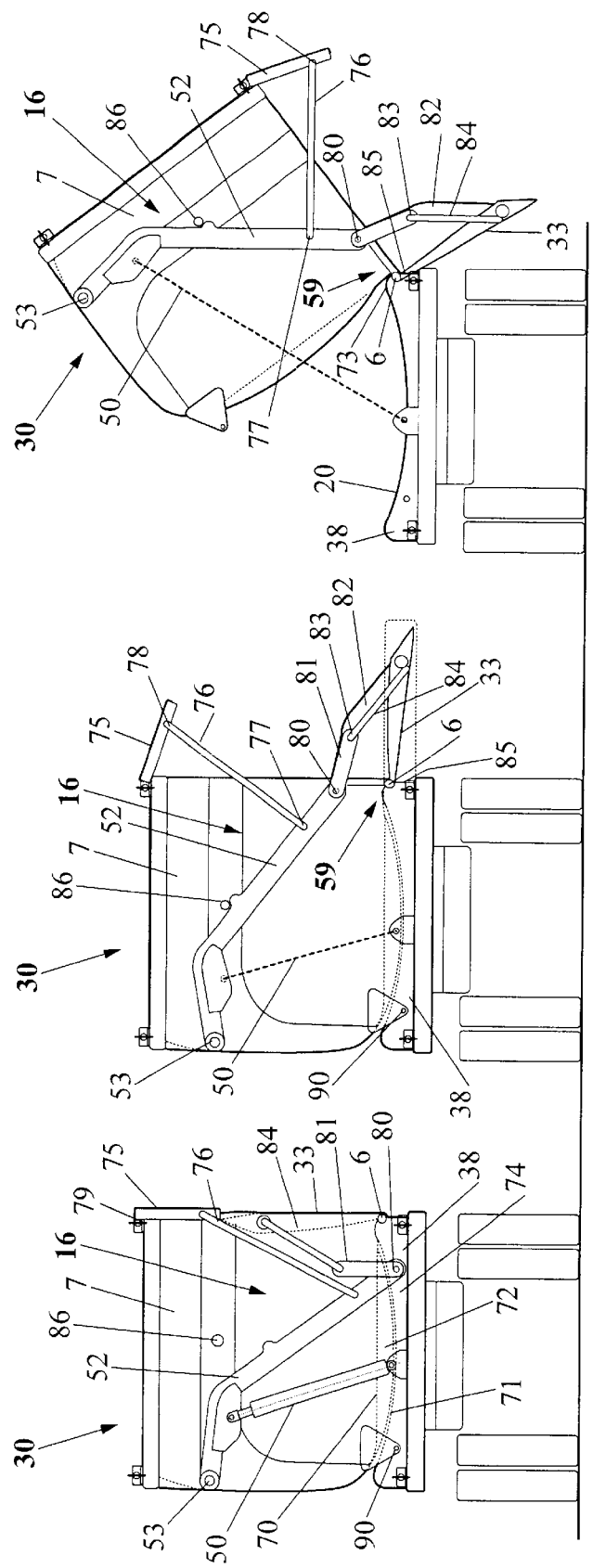
FIGS. 9a to 9c are respective end views of a third preferred embodiment of a vehicle tipper system according to the present invention.
Figure 10:
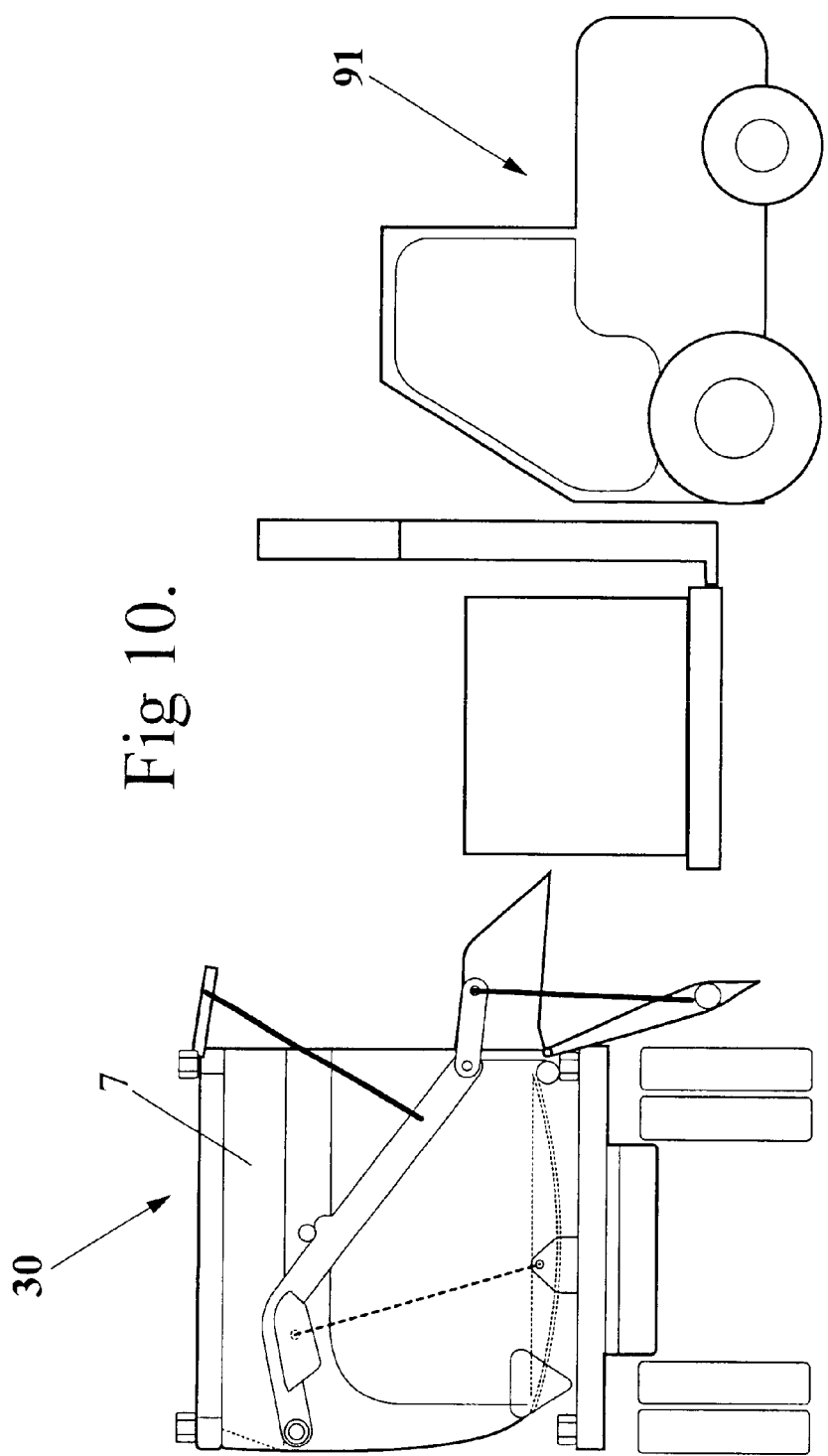
FIG. 10 is an end view of the vehicle tipper system of FIGS. 9a to 9c showing an alternative operation thereof.

FIGS. 9a to 10 show a third preferred embodiment of a vehicle tipper system according to the present invention. The same reference numerals are used to designate integers corresponding to those in the arrangement shown in the earlier two described embodiments.

As in the earlier preferred embodiments, the container body 30 includes an end panel 7 at each end of the body 30 which may be secured by either welding or bolting methods. The side wall 33 is a sub-assembly that is connected to the floor of the body 30 by a rubber hinge 59, and each end of the side wall 33 also has rubber seals. This feature makes the unit leak resistant. The construction of body sides are curved, the advantage being that it strengthens the body along its length, therefore, eliminating the need for vertical side reinforcements.

The floor can be either be constructed flat 70 or curved 71. The flat floor 70 would suit an operation, which required the cartage of bulk solids one way, and pallet or break-bulk the other, this system is called backloading and ensures that the trailers are utilised effectively in both directions. The flat floor 70 requires lateral cross members 72 built into the construction, these are welded to the underside of the body skin, and ensures the floor skin is kept rigid. The edge of the cross member adjacent to the body skin, has a strip welded which has the same contour of the cradle chassis frame 38. This is to ensure full support when loaded and support for the floor when being transported or while discharging.

The curved floor 71 would primarily be used for bulk solids cartage. This type would be slightly lighter in tare weight due to the fact that it does not require cross members for floor support. The strength is a built in characteristic by forming a curve in the floor.

The cradle frame 38 supports the body 30 while being transported and or being lifted by a forklift 91. The cradle top plate 20 in which the body rests is rolled to the same contour as the body. In between the body and the cradle are several rubber strips 21 which have been laid and spaced evenly along the length of the cradle top plate 20, relative to the cross members located inside the cradle's construction, this is to ensure a cushion exists between the body and cradle. The top plate 20 extends to the base of the cradle, on tipping side of the cradle the top plate has a radius 73 formed into it, this is to allow the body during tipping to roll evenly around giving support along the full length of the body. Beneath the cradle top plate 20 are a series of cross members 72 spaced evenly along the length of the cradle 38. These cross members 74 are welded to the underside of the cradle top plate 20 and extend to the base 40 of the cradle 38.

It is envisaged that the vehicle tipper system be adapted for intermodal container applications. To this end, towards the middle of the container body 30 can be provided two standard fork pockets (not shown) as well as eight ISO container twist locks (not shown) four on the bottom and four at the top at standard ISO dimensions. This allows the container body 30 to be lifted off the cradle frame 38 and placed onto a standard road trailer or rail wagon. The ISO twist locks can be sued to secure the container body 30 thereon. The container body 30 can therefore be treated in the same way as an ISO container.

The actuation assembly 16 attached to both ends of the container body 30 has two functions:

i. To open an upper door 75 and the side wall 33 or lower door so that any bulk material that is inside can be discharged by tipping the container body 30 over so that the product can flow out the opening freely. (See FIGS. 9a to 9c).

ii. To open the upper and lower doors 75, 33 to the extent that the lower door 33 is almost perpendicular to the ground so that the body 30 can be loaded horizontally. For example, a forklift 91 loading palettes of goods onto the trailer. (See FIG. 10).

Referring to function (i), as the primary linkage arm 52 extends out, which is attached to the top of the ram assembly 50, ram assembly 50 will operate the linkages connected to the upper door 75 and lower door 33 and cause them to open simultaneously.

The upper door 75 is activated by a rigid link 76 that is mounted to the primary linkage arm 52 by a pin joint at point 77. A second pin joint 78 is mounted from the top of the rigid link 76 to the opening side of the upper door 75, which is hinged at the top right hand corner of the container at point 79 (viewing container from the rear). As the primary linkage arm 52 pivots from point 53 the resulting action is that the rigid link connection from the linkage arm 51 to the upper door 75 will rotate and open the door at the hinge point 79 until it reaches its open position.

The lower door 33 is pin jointed at point 80 to the primary linkage arm 52 using a clevis link bar 81, the top of which is connected to a side guard plate 82 at point 83. Then from here a further ram assembly 84 is pin joined as well to the side guard plate 82 and the lower door 33 at points 80 and 83. Both the side guard plate 82 and the lower door 33 are hinged at the same pivot point 85. As the primary linkage arm 52 pivots from point 53 the pin joint connection 80 from the bottom of the arm 52 to the clevis link bar 81 will push and rotate the lower door 33 open from the side guard plate 82. Since lower door 33 and the side guard plate 82 have a link between them, and are hinged at the same point, the two will rotate in unison from the same hinge point, as the clevis link bar 81 rotates the side guard plate 82.

Once the two doors 75, 33 have reached their required open position the primary linkage arm 52 will be prevented from rotating any further, by a stop mechanism 86 which will be a direct contact point from the arm 51 to end panel 7 of the container. Since the arm 51 will no longer be able to rotate, the only option left is for the ram assembly 50 to then lift and rotate the body 30 at point 6. The body will then tip and discharge any load it has inside the body out and away from the container. Furthermore, a secondary safety prop (not shown) can be mounted from points 80 to 83 to further prevent the lower door 33 opening further, but only used when discharging bulk by tipping the container.

Should the opening be required to only allow access to load horizontally, then rather than the body 30 rotating and tipping, a manual, or automatic locking mechanism engages the body to the chassis at point 90, then the further ram assembly 84 connected from the side guard plate 82 to the lower door 33 will activate and extend. This will rotate the lower door 33 until it is almost perpendicular to the ground, which will enable access for a forklift 91 to drive up close to the container to load it.

The flexible hinge 59 of the vehicle tipper system shown in FIGS. 9a to 10 is adapted to allow for the side wall 33 to open to its tipping position as shown in FIG. 9c or be opened in a loading position such that the side wall 33 is 20 almost perpendicular to the ground as shown in FIG. 10 to allow access for horizontal loading. FIGS. 11a to 11c, and FIGS. 12a to 12c show two such possible arrangements of the flexible hinge 59 adapted for this function.

Each flexible hinge 59 arrangement is similar in having three compressible rubber billets 95 extending along at least substantially the full length of the side 25 wall 33. Each billet 95 is located between a flange portion 96 of the body skin 12, a flange portion 94 of the side wall 33, or the flange sections 98 of a channel 97. The billets 95 may be held in compression between the associated flange portions 96, 94, 98 by a series of fastening bolts 99 as shown schematically in FIGS. 11a to 11c, the fastening bolts 99 passing through the middle of the billet 30 95 and through the associated flange portions 94, 96, 98 on either side of the billet 95. These fastening bolts 99 are evenly spaced along the length of each billet 95.

Alternatively, as shown in FIGS. 12a to 12c, clamps 100 extending along at least substantially the entire length of the billet 95 can be provided to hold the billet 95 in compression between the associated flange portions 96, 94, 98. The clamp 100 may be retrained in position by fastening bolts 101 extending through the clamp 100 and through the thickness of the billet 95.

Figure 11C:
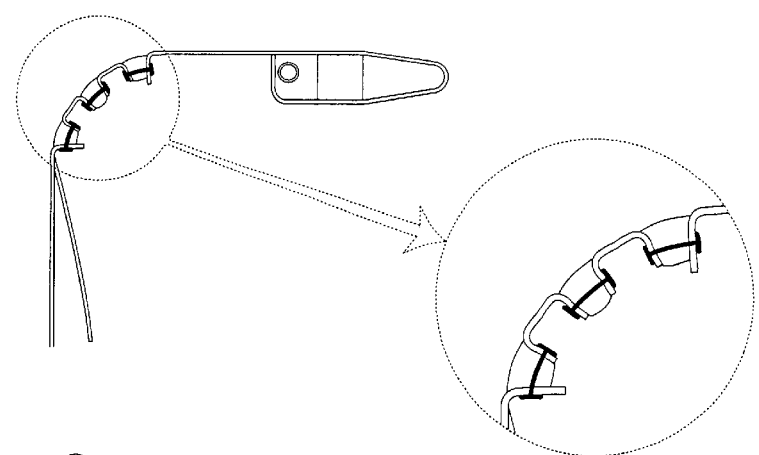
FIGS. 11a to 11c are schematic cross-sectional side views respectively showing three stages of opening of another arrangement of the flexible hinge of the vehicle tipper system according to the present invention.
Figure 11B:
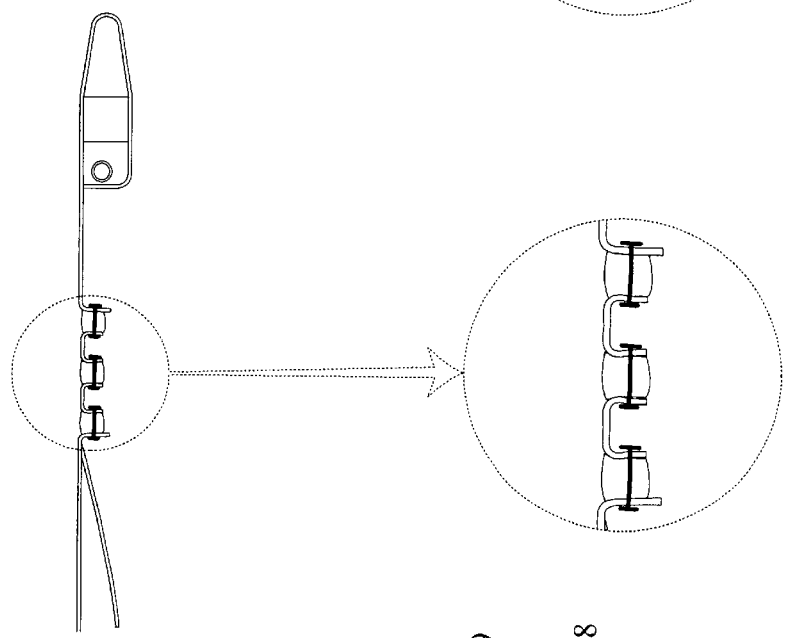
Figure 11A:
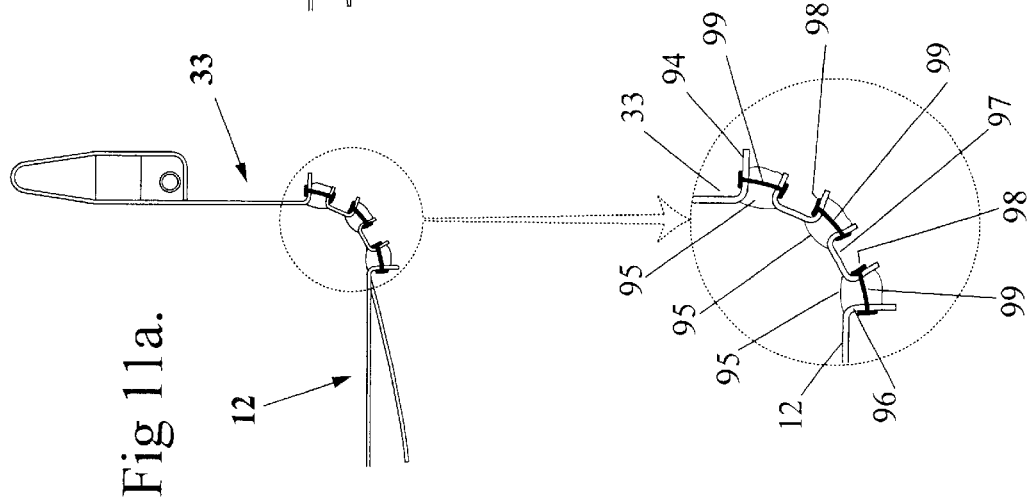

FIGS. 11a and 12a show the flexible hinge 59 when the side wall 33 is in closed position. FIGS. 11b and 12b show the flexible hinge 33 when the side wall 33 is in its tipping position. FIGS. 11c and 12c show the flexible hinge 59 when the side wall is in its loading position. In all the above positions, the billets 10 95 are held in compression and are at no time in tension. This is because the fastening bolts 99 or clamps 100 maintain a compression force through the centre of the billets 95. The fastening bolts 99 or clamps 100 connect the side wall 33 to a channel section 97, connect the body skin 12 to a channel section 97, or connect together the two channel sections 97. There is however no direct connection of the billet 95 to the channel section 97, side wall 33 or body skin 12 and so the billet 95 is never held in tension.

An alternative possible arrangement of a flexible hinge 59 adapted for use in the vehicle tipper system shown in FIGS. 9a to 10 is shown in FIGS. 13a to 13c. This flexible hinge 59 includes one or more compressible rubber billets 95 held together by one or more cables 102 passing through the or each billet 95, the cable 102 being supported at each end on a respective side wall flange portion 94 or body skin flange portion 96. A pivotable mount 103 is provided on one end of the cable 102, a lock nut 104 being provided on the other end of the cable 102 for tensioning the cable 102.

In all of the flexible hinges 59 shown in FIGS. 11a to 13c, the fastening bolts 99, clamps 100 or cables 102 all act to maintain a variable but maximum fixed width between the side wall flange portion 94 and the body skin flange portion 96. This allows the compressible rubber billets 95 to be compressed and to be released while at the same time holding the various components of the flexible hinge 59 together and in position.

In all of the described embodiments using the flexible hinge arrangement, that hinge is shown located adjacent the bottom floor of the container body. It is however also to be appreciated that the flexible hinge could be located higher up the container body away from the bottom thereof. This arrangement increases the certainty that there will be no leakage of fluid where the container body is holding products having a high moisture content as the raising of the height of the flexible hinge will effectively increase the holding capacity of the amount of fluid that can be held within the container body. This would be the case even if the sealing at the flexible hinge was to fail or partially fail. The displaceable wall will of course be reduced in width if the height of the flexible hinge is raised. The other result of this will be that the optimum tipping angle of discharge of the container body will need to be greater if the flexible hinge height is raised.

The vehicle tipper system according the present invention has the advantages of conventional door type side tipper systems in being able to readily dispose of the product being carried during its tipping motion. The door hinges are however eliminated thereby avoiding the types of maintenance problems that arise due, for example, to corrosive materials entering the hinges and seizing them up, or material being caught in and breaking the hinges. Also, unlike conventional door hinges, the tipper system according to the present invention can be adapted to provide a tight seal thereby preventing the loss of liquids or other products from the container body. The overall weight of the tipper system according to the present invention is also substantially lower than the weight of a conventional door type side tipper system.

An additional advantage of the vehicle tipper system is that the tipping action is such that the displaceable side wall is a significant distance from the ground, even when open. This means that there is less likelihood of the side wall being caught in the pile of material being dumped on the ground.

The above description is provided for the purposes of exemplification only, and it will be understood by a person skilled in the art that modifications and variations may be made without the departing from the invention as defined in the accompanying claims.

What is claimed is:

1. A vehicle tipper system comprising:
   a container body having a displaceable side wall located on a discharge side of the container body, the side wall being flexibly connected by a flexible sheet connection and displaceable relative to the rest of the container body;
   at least one actuation assembly for displacing the side wall to an open position away from the rest of the container body; and for tipping the container body such that product held within the container body can be tipped from the discharge side thereof when the side wall is in the open position.

2. A vehicle tipper system according to claim 1, wherein the container body includes a body skin supported to form a relatively rigid elongate channel for holding said product, the body skin providing a floor, a fixed side walk, and the displaceable side wall to the container body.

3. A vehicle tipper system according to claim 1, wherein the container body includes a body skin supported to provide at least a floor, and a fixed side wall of the container body, the displaceable side wall being joined by the flexible sheet connection to the body skin such that the body skin and the displaceable side wall together form an elongate channel for holding said product.

4. A vehicle tipper system according to claim 3, wherein the flexible sheet connection is in the form of at least one flexible sheet extending along at least substantially the entire length of the displaceable side wall and interconnecting the displaceable side wall and the body skin.

5. A vehicle tipper system according claim 4, the flexible sheet connection includes an elongate flexible sheet sandwiched between the body skin and a first backing plate along one edge thereof, and sandwiched between the displaceable side wall and a second backing plate along an opposing edge thereof.

6. A vehicle tipper system according to claim 3, wherein the flexible sheet connection includes at least one elongate flexible billet extending along at least substantially the entire length of the side wall, and located between a flange portion of the body skin and a flange portion of the displaceable wall, the billet being held in compression therebetween.

7. A vehicle tipper system according to claim 6, wherein a plurality of flexible billets are provided, and at least one intermediate channel section is located between adjacent billets, with the billets being held in compression between the flange portions of the body skin and displaceable side wall and a flange portion of the at least one channel section.

8. A vehicle tipper system according to claim 6, wherein the at least one billet is held in compression by fastening means passing through the flange portions and the billet located therebetween.

9. A vehicle tipper system according to claim 6, wherein the at least one billet is held in compression by clamps clamping together the flange portions and the billet located therebetween.

10. A vehicle tipper system according to claim 6, wherein a plurality of flexible billets are provided, the billets being located in an abutting relationship and held together by at least one cable extending through the billets.

11. A vehicle tipper system according to claim 10, including means for controlling the tension of said at least one cable.

12. A vehicle tipper system according to claim 1, wherein the container body is supported on a chassis cradle frame, and is pivotally mounted at body pivot points to the chassis cradle frame, the body pivot points being located adjacent the discharge side of the container body.

13. A vehicle tipper system according to claim 12, wherein the actuation assembly includes a door ram assembly for displacing the displaceable side wall, the door ram assembly being pivotally mounted at one end thereof to the displaceable side wall, and at the other end thereof to an end assembly, the actuation means further including a body ram assembly for tipping the container body, the body ram assembly being pivotally mounted at one end thereof to the end assembly of the container body, and at the other end thereof to the chassis cradle frame.

14. A vehicle tipper system according to claim 12, wherein the actuation assembly includes a ram assembly, and a mechanical linkage arrangement for both displacing the side wall and for tipping the container body.

15. A vehicle tipper system according to claim 14, wherein the mechanical linkage arrangement includes a primary linkage arm pivotally connected at one end thereof at or adjacent to a top corner of an end assembly away from the displaceable side wall, a secondary linkage arm pivotally connected at one end thereof to the displaceable side wall and having a lateral extension pivotally mounted adjacent the chassis cradle frame, the opposing ends of the primary and secondary linkage arms being interconnected by a cross linkage, and wherein the ram assembly is pivotally connected at one end thereof to the chassis cradle frame and is connected at the other end thereof to the primary linkage arm.

16. A vehicle tipper system according to claim 12, wherein the container body includes a further upper door located over the displaceable side wall and pivotally mounted on the container body, and wherein the actuation assembly includes means to open both the upper door and displaceable side wall.

17. A vehicle tipper system according to claim 16, wherein the actuation assembly includes a linkage arm pivotally connected at one end thereof at or adjacent to a top corner of an end assembly of the container body away from the displaceable side wall, the linkage arm being urged for movement by a ram assembly, a rigid link connecting the upper door to the linkage arm, and further linkage means interconnecting the displaceable side wall with the linkage arm, such that movement of the linkage arm opens both the displaceable side wall and the upper door.

18. A vehicle tipper system according to claim 17, including a further actuation means for displacing the displaceable side wall, the further actuation means including a further ram assembly interconnecting the displaceable side wall with the rest of the actuation assembly such that the displaceable side wall can be displaced independently from the rest of the container body.

19. A vehicle tipper system according to claim 18, wherein the displaceable side wall is moveable to a position which allows for close-up loading of the container body by a forklift truck.

20. A vehicle tipper system according to claim 1, wherein a said actuation assembly is located at opposing ends of the container body.

21. A tipping vehicle including a vehicle tipper system according to claim 1.

* * * * *

UNITED STATES PATENT AND TRADEMARK OFFICE
CERTIFICATE OF CORRECTION

PATENT NO. : 6,626,498 B1
DATED : September 30, 2003
INVENTOR(S) : Bernd Ostermeyer It is certified that error appears in the above-identified patent and that said Letters Patent is hereby corrected as shown below:

Column 1,
Line 12, delete ".".
Line 29, delete "a" before the inclusion

Column 5,
Line 47, delete "railing" and insert -- rail --
Line 57, delete "(full)"

Column 7,
Line 51, delete "pint" and insert -- point --

Column 8,
Line 46, delete "sued" and insert -- used --

Column 9,
Line 47, delete "20"
Line 54, delete "25"
Line 61, delete "30"

Column 10,
Line 10, delete "10"

Column 11,
Line 27, delete "walk" and insert -- wall --
Line 41, insert -- to -- between "according" and "claim"

Signed and Sealed this

Twenty-fourth Day of February, 2004

JON W. DUDAS
*Acting Director of the United States Patent and Trademark Office*